US012062361B2

United States Patent
Elkhatib et al.

(10) Patent No.: US 12,062,361 B2
(45) Date of Patent: Aug. 13, 2024

(54) WAKE WORD METHOD TO PROLONG THE CONVERSATIONAL STATE BETWEEN HUMAN AND A MACHINE IN EDGE DEVICES

(71) Applicant: AONDEVICES, INC., Irvine, CA (US)

(72) Inventors: Mouna Elkhatib, Irvine, CA (US); Adil Benyassine, Irvine, CA (US); Aruna Vittal, Irvine, CA (US); Eli Uc, Irvine, CA (US); Daniel Schoch, Irvine, CA (US)

(73) Assignee: AONDEVICES, INC., Irvine, CA (US)

( * ) Notice: Subject to any disclaimer, the term of this patent is extended or adjusted under 35 U.S.C. 154(b) by 0 days.

(21) Appl. No.: 17/517,568

(22) Filed: Nov. 2, 2021

(65) Prior Publication Data

US 2022/0139379 A1 May 5, 2022

Related U.S. Application Data

(60) Provisional application No. 63/108,508, filed on Nov. 2, 2020.

(51) Int. Cl.
  *G10L 15/08* (2006.01)
  *G10L 25/78* (2013.01)
  *H04L 67/12* (2022.01)

(52) U.S. Cl.
  CPC .............. *G10L 15/08* (2013.01); *G10L 25/78* (2013.01); *H04L 67/12* (2013.01); *G10L 2015/088* (2013.01); *G10L 2025/783* (2013.01)

(58) Field of Classification Search
  CPC ... G10L 15/08; G10L 25/78; G10L 2015/088; G10L 2025/783; G10L 15/22; G10L 17/08; H04L 67/12
  See application file for complete search history.

(56) References Cited

U.S. PATENT DOCUMENTS

| | | | |
|---|---|---|---|
| 9,098,467 B1 * | 8/2015 | Blanksteen | G10L 15/22 |
| 9,548,053 B1 * | 1/2017 | Basye | G10L 15/22 |
| 10,460,215 B2 * | 10/2019 | Herold | G10L 15/32 |
| 10,847,149 B1 * | 11/2020 | Mok | G06F 40/30 |
| 10,878,809 B2 * | 12/2020 | Gruber | G10L 15/28 |
| 11,308,962 B2 * | 4/2022 | Smith | G10L 15/30 |
| 11,361,756 B2 * | 6/2022 | Smith | G10L 15/22 |
| 11,361,763 B1 * | 6/2022 | Maas | G10L 15/18 |
| 2013/0339028 A1 * | 12/2013 | Rosner | G10L 15/22 704/E11.001 |
| 2014/0163978 A1 * | 6/2014 | Basye | G10L 15/28 704/233 |

(Continued)

*Primary Examiner* — Fariba Sirjani
(74) *Attorney, Agent, or Firm* — Stetina Brunda Garred & Brucker

(57) ABSTRACT

A voice-activated system edge device cooperating with a remote command processor has a state machine defined by a listening mode state and a conversation monitoring mode state. The state machine transitions from the listening mode state to the conversation monitoring mode state in response to a wake word detection. A command accompanying the wake word is transmitted to the remote command processor for execution thereon. The conversation monitoring mode state is maintained for a conversation monitoring window time duration to receive a connection word accompanied by another command transmitted to the remote command processor for further execution thereon.

16 Claims, 7 Drawing Sheets

(56) References Cited

U.S. PATENT DOCUMENTS

| | | | | |
|---|---|---|---|---|
| 2014/0214429 A1* | 7/2014 | Pantel | ............... | G10L 15/22 |
| | | | | 704/275 |
| 2016/0155443 A1* | 6/2016 | Khan | ............... | G06F 3/167 |
| | | | | 704/275 |
| 2018/0233132 A1* | 8/2018 | Herold | ............... | G10L 15/1822 |
| 2018/0286414 A1* | 10/2018 | Ravindran | ............... | G10L 15/08 |
| 2018/0301151 A1* | 10/2018 | Mont-Reynaud | ............... | G10L 15/22 |
| 2019/0066680 A1* | 2/2019 | Woo | ............... | G10L 15/30 |
| 2019/0172460 A1* | 6/2019 | Jin | ............... | G10L 15/30 |
| 2019/0266996 A1* | 8/2019 | Lesso | ............... | G10L 17/06 |
| 2019/0311721 A1* | 10/2019 | Edwards | ............... | G10L 17/06 |
| 2020/0043482 A1* | 2/2020 | Gruber | ............... | G10L 15/26 |
| 2020/0047687 A1* | 2/2020 | Camhi | ............... | G10L 15/22 |
| 2020/0051554 A1* | 2/2020 | Kim | ............... | G06F 3/167 |
| 2020/0125630 A1* | 4/2020 | Sanghavi | ............... | G06F 40/114 |
| 2020/0395006 A1* | 12/2020 | Smith | ............... | G10L 15/083 |
| 2021/0027774 A1* | 1/2021 | Kessler | ............... | G06F 40/30 |
| 2021/0335360 A1* | 10/2021 | Chung | ............... | G10L 15/142 |
| 2022/0139379 A1* | 5/2022 | Elkhatib | ............... | G10L 15/08 |
| | | | | 704/200 |

* cited by examiner

WAKE WORD METHOD TO PROLONG THE CONVERSATIONAL STATE BETWEEN HUMAN AND A MACHINE IN EDGE DEVICES

CROSS-REFERENCE TO RELATED APPLICATIONS

This application relates to and claims the benefit of U.S. Provisional Application No. 63/108,508 filed Nov. 2, 2020, and entitled "WAKE WORD METHOD TO PROLONG CONVERSATIONAL STATE BETWEEN HUMAN AND MACHINE IN EDGE DEVICES, the entire disclosure of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to human-computer interfaces, and those that are voice-activated. More particularly, the present disclosure is directed to enabling a longer conversational state between human and machine without the necessity of re-invoking a wake word.

2. Related Art

Voice activation has become more and more popular with the increase in voice assistants such as Amazon Alexa and Google voice assistants. Such voice assistants are activated by a user speaking a wake phrase such as "Hey Alexa", "OK Google", or "Hey Ski." Upon activation, the voice assistant may be issued one or more commands or queries from the user, such as to check the weather, activate or deactivate an IoT (Internet of Things) device, play music, or otherwise retrieve information from the Internet/Web. If the wake phrase is not immediately followed by a command or a query, there may be a predetermined duration for which the voice assistant continues to capture audio in anticipating of the forthcoming command or query.

One deficiency in the current state of the art is that each single interaction between human and machine must be invoked with the wake word. Thus, it may become tedious for the user to repeat the wake word for every command one would like to issue, or for multiple questions one would like to ask. For example, whereas a more natural human conversation, asking for the time and the weather may be as straightforward as asking "What is the time, and what is the weather?", conventional voice assistants may require the user to utter two separate questions preceded by the wake word, such as "[wake word], what is the time?" and "[wake word], what is the weather?" Because the voice assistant processes each request in sequence, the user may need to listen to the answer for the first question before being able to ask the second question. This results in a stilted and awkward conversation and may discourage further use because of the tedious nature of such interaction.

In most conventional voice assistants, the captured audio data is transmitted to a remote server or cloud system with more processing capacity, especially in comparison to the edge device that has a scaled-down processor and oftentimes subject to power and/or form factor constraints. The results of any query, and the instructions to execute any issued commands, is transmitted back to the edge device or other local system. The data for the weather report, for instance, may be transmitted for announcement by the edge device/voice assistant, or a command to activate a specified IoT device may be relayed to the edge device for execution thereon.

For privacy reasons, the transmission of captured audio data to the remote/cloud system may be suspended after an issued command is completed, or an inquiry is completed. Some edge devices may take the additional step of blocking the microphone from capturing any audio other than the next utterance of the wake word. Upon so detecting the wake word, the data stream to the cloud may be reactivated for processing the next command/inquiry.

Current voice assistants, in particular, those relying on a wider cloud infrastructure for voice recognition, may ask contextually relevant follow-up questions to the user after the wake word-accompanied command. For example, the response to "[wake word] what is the time?" may be "the time is 6:30 PM. Do you want me to order dinner?" In this example, the voice assistant is not expecting further input from the user, and other such responses may be selected for the voice assistant to announce so that there is no possibility of further commands without re-invoking the wake word.

There is accordingly a need in the art for a voice assistant system that better replicates a natural conversation sequence without the awkward utterance of wake work multiple times to issue related commands/inquiries in sequence.

BRIEF SUMMARY

The various embodiments of the present disclosure are directed to mimicking a natural conversation sequence between one or more human users and a smart device that responds to voice command. The conversation sequence may be initiated with the single utterance of the wake word without the necessity for the user to reinvoke the wake word for each command.

According to one embodiment, there may be a voice-activated system edge device cooperating with a remote command processor. The edge device may include a state machine that is defined by a listening mode state and a conversation monitoring mode state. The state machine may transition from the listening mode state to the conversation monitoring mode state in response to a wake word detection. A command accompanying the wake word may be transmitted to the remote command processor for execution thereon. The conversation monitoring mode state may be maintained for a conversation monitoring window time duration to receive a connection word accompanied by another command transmitted to the remote command processor for further execution thereon.

In another embodiment, there may be a method for extending a conversational state between a user and a voice-activated system edge device cooperating with a remote command processor. The method may include receiving a first audio signal of a wake word and an accompanying first command. There may also be a step of detecting the wake word, followed by a step of transmitting the first command to the remote command processor for execution thereby in response to the detection of the preceding wake word. The method may include setting a conversation monitoring mode on the edge device after the first command is executed by the remote command processor. There may additionally be a step of receiving, on the edge device while in the conversation mode, a second audio signal of a connection word and an accompanying second command. The connection word may be different from the wake word. The method may also include transmitting the second command to the remote command processor for execution thereby.

Another embodiment of the present disclosure may further incorporate a step of setting a listening mode on the edge device after expiration of the predetermined conversation monitoring window time duration. The edge device may be receptive solely to a subsequent wake word and accompanying command.

Still another embodiment of the method may include receiving, on the edge device while in the conversation mode, a third audio signal of a second wake word and an accompanying third command. The method may also include transmitting the third command to the remote command processor for execution thereon.

Another embodiment is directed to a non-transitory computer readable medium that includes instructions executable by a data processing device to perform the foregoing steps of the method for extending a conversational state between a user and a voice-activated system edge device cooperating with a remote command processor.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of wake word methods and systems for prolonging a conversational state between a human and a machine in edge devices. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

The embodiments of the present disclosure are contemplated to improve the user experience for smart device interactions with speech commands. Typical interaction sequences with such devices require the user to speak a wake word for every command or request, and thus the present disclosure contemplate a solution in which the interaction more closely resembles a human conversation by requiring the wake word only once while accepting a sequence of commands. As will be described in further detail below, in one embodiment, the identity of the user/speaker is monitored in a system state machine to ensure that the same user/speaker is making the requests within a specified period of time.

Figure 1:
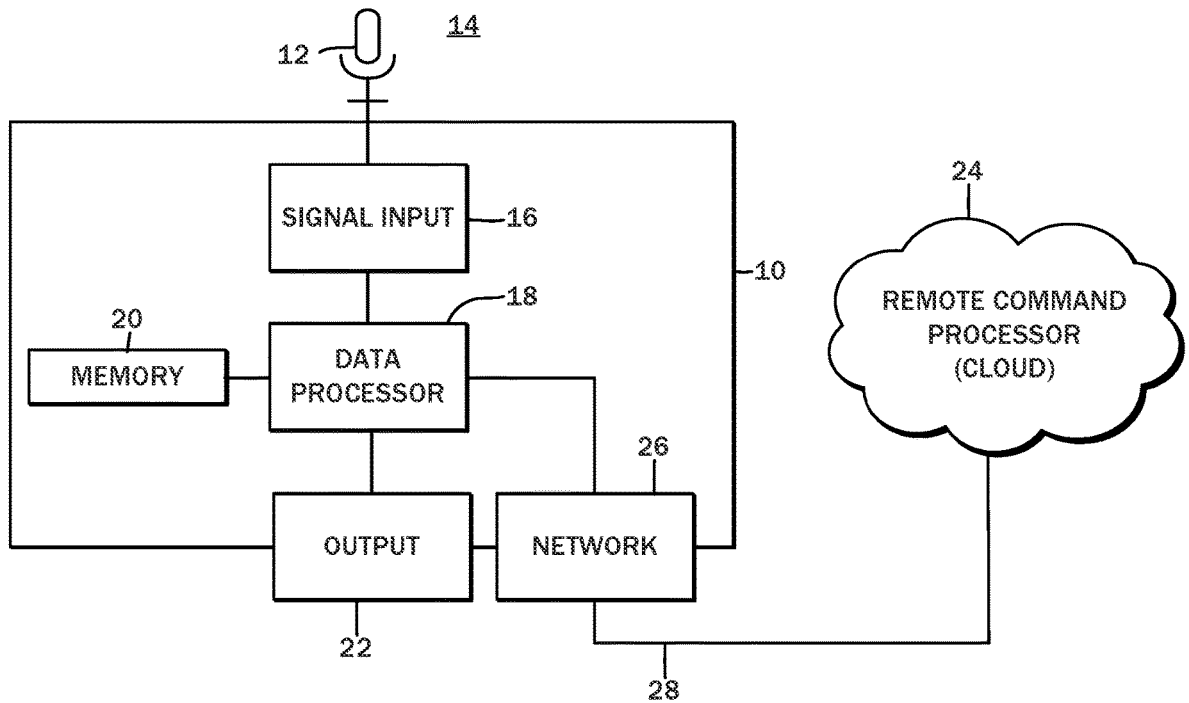
FIG. 1 is a block diagram of an exemplary edge device cooperating with a remote command processor according to an embodiment of the present disclosure.

With reference to the block diagram of FIG. 1, one aspect of the presently disclosed systems and methods for extending a conversation sequence may be implemented on an edge device 10. By way of example and not of limitation, the edge device 10 may be used for processing speech and performing further data processing operations in response to commands detected in the inputted audio. To this end, the edge device 10 may include a signal input device 12 or microphone, which captures acoustic waves propagating through a surrounding environment 14 and converts those acoustic waves to corresponding analog electronic signals or waveforms. In order to process the electronic signals, there may be a signal input processor 16. In its most basic form, the signal input processor 16 may be an analog-to-digital converter (ADC) that converts discrete voltage values of the analog signal to equivalent numeric or digitally represented numbers at set sampling intervals.

The edge device 10 includes a data processor 18 that can be programmed with instructions to execute various operations. The data processor 18 may be connected to the signal input processor 16 to receive the converted digital audio stream data from the captured audio and apply various operations thereto. As will be described more fully below, the data processor 18 may be programmed with instructions to implement a state machine for extending the conversation sequence with the user. These instructions and other related data may be stored on a memory 20.

Generally, the results of the operations performed by the data processor 18 may be provided to an output 22. In the context of one exemplary embodiment of a voice-activated assistant device, the data processor 18 may be further programmed to recognize commands issued to the edge device 10 by a human speaker, execute those commands, obtain the results of those commands, and announce the results to the output 22. In other embodiments, the output 22 may be a display device that visually presents the results. Still further, the output 22 may connect to a secondary device, either locally or via one or more networks, to relay the results from the data processor 18 for further use by such secondary remote devices.

In some embodiments, the edge device 10 performs only basic voice recognition tasks, such as to determine the utterance of a predefined wake word. The processing power of the data processor 18 may be limited due to several design constraints generally applicable to consumer level smart devices, such as electrical power consumption, size, and cost. The command that accompanies the wake word, and specifically the raw audio data thereof, may be transmitted to a remote command processor 24. In one embodiment, the remote command processor 24 is a networked arrangement of server computer systems connected to the Internet and may be referred to more generally as a "cloud" platform. The edge device 10 is understood to incorporate a network interface 26 to the Internet, which in turn allows a connection 28 to the remote command processor 24. The processing capabilities of the remote command processor 24 are understood to be significantly greater than the edge device 10 and can apply speech recognition processes to the raw audio data in real time. Furthermore, once the speech/command is recognized, the resulting query may be processed, with the results of such query being transmitted back to the edge device 10 via the same network interface 26 and presented.

A user may speak a wake word/phrase such as "Hey Google", "Hey Ski" or "Hey Alexa," and follow that with a question or query, generally referred to as a command. Example commands may include questions such as "what is the weather?", "how do I get to the nearest supermarket?" or "how tall is the Empire State Building?" Additionally, control of local Internet of Things (IoT) devices such as connected lights, HVAC systems, and smart speakers capable of playing music are also possible. Commands to manipulate such devices such as "turn off kitchen lights", "set temperature to 72 degrees," or "play Halloween music" may also be spoken by the user. The command portion of the audio input is understood to be transmitted to the remote command processor 24 for recognition.

Once recognized, the query may be processed by a search engine. In the example query of "what is the weather?", the query to the search engine may return an answer pertaining to the local weather conditions. The weather data may be transmitted back to the edge device 10 and announced/read out through the output 22. Along these lines, an answer to the question regarding the height of the Empire State Building may involve a search on a general Internet search engine, with the top results being processed to extract the specific data element, e.g., one pertaining to the height. The remote command processor 24 may format the result, such as by structuring the height data into a specific statement to be announced on the edge device 10, such as "the height of the Empire State Building is 1,454 feet including the spire and the antenna."

Although the edge device 10 is connected to the same local network as other IoT devices, many smart home systems may similarly employ a cloud-based platform for control. In such case, the command to turn on/off lights or set climate control parameters may first be recognized by the remote command processor 24, transmitted back to the edge device 10, which in turn communicates with the IoT cloud platform to request the execution of such commands.

As can be seen from the foregoing examples, a wide range of questions and requests may be spoken by the user to the edge device 10. As referenced herein, a command is understood to encompass all such questions, requests, queries, and the like, and in accordance with various embodiments of the present disclosure, a sequence of such commands may be spoken without the need for the user to additionally utter the wake word prior to each command.

Figure 2:
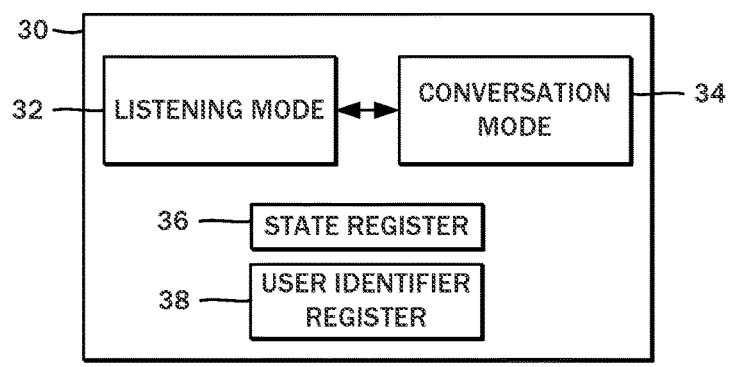
FIG. 2 is a block diagram of an example state machine utilized to implement systems and methods for extending a conversational sequence with a human user without invoking a wake word.

With reference to the block diagram of FIG. 2, one exemplary embodiment of the edge device 10 may be implemented as a state machine 30 that has a first or listening mode 32, and a second or conversation monitoring mode 34. The state machine 30 transitions between the first/listening mode 32 and the second/conversation monitoring mode 34 to enable the extending of a conversational state between the edge device 10 and the user. The state machine 30 has a state register 36 in order to track the status of whether it is in the first mode or the second mode. Furthermore, the state machine 30 also has a user identifier register 38 to track the identity of the user speaking and providing commands to the edge device 10, as there is a possibility for multiple users who are attempting to interact with the edge device 10 in a single conversation sequence. The specific use of the user identifier register 38 will be detailed more fully below. The status of the state machine 30, and the identify of the user from which commands are being spoken affects the procedures performed by the edge device 10 and the remote command processor 24, so both the state register 36 and the user identifier register 38 are understood to be accessible or readable by each. Similarly, the status of the state machine 30 and identity of the user may be changed by both the edge device 10 and the remote command processor 24, so the state register 36 and the user identifier register 38 are write-accessible to each.

The state machine 30 transitions from the listening mode 32 to the conversation monitoring mode 34 at the detection of a wake word. The transition from the conversation monitoring mode 34 back to the listening mode 32 occurs only at the expiration of a conversation monitoring window. In this way, the edge device 10 is able to mimic natural human conversation without intervening wake words. The initial state of the state machine 30/edge device 10 is the listening mode 32, in which the state register 36 is set to a value of 0. At some indeterminate time, the user speaks a wake word, and begins the conversation with the edge device 10. Per usage convention, the wake word is accompanied by some command as described above. The edge device 10 then detects the wake word and establishes a session with the remote command processor 24 with an interrupt. The wake word and the accompanying command is then transmitted to the remote command processor 24 over the established session.

Upon receiving the interrupt, the remote command processor 24 reads the state register 36. If the stored value is zero, according to one embodiment, the remote command processor 24 may revalidate the wake word. Further, upon validating the wake word, the command accompanying such wake word is executed. Based upon the audio of the wake word and the command, a user identification procedure may be executed by the remote command processor 24. In various embodiments, this may involve deriving a speaker signature by applying a scoring function that can match identities. Features derived from the audio data/speech waveforms, such as pitch frequency, Mel-frequency cepstrum coefficients (MFCC), and Log-Mel filterbank energies may be transformed into a representation such as i-vectors that are derived from a deep neural network or d-vectors that are derived from a Gaussian subspace model. Regardless of the specifics of the implementation, the derived value of the user identifier is stored in the user identifier register 38. The state register 36 is then set to a value of 1 to indicate that the state machine 30 has been changed to the conversation monitoring mode 34, and the remote command processor 24 enters a sleep state.

Figure 3:
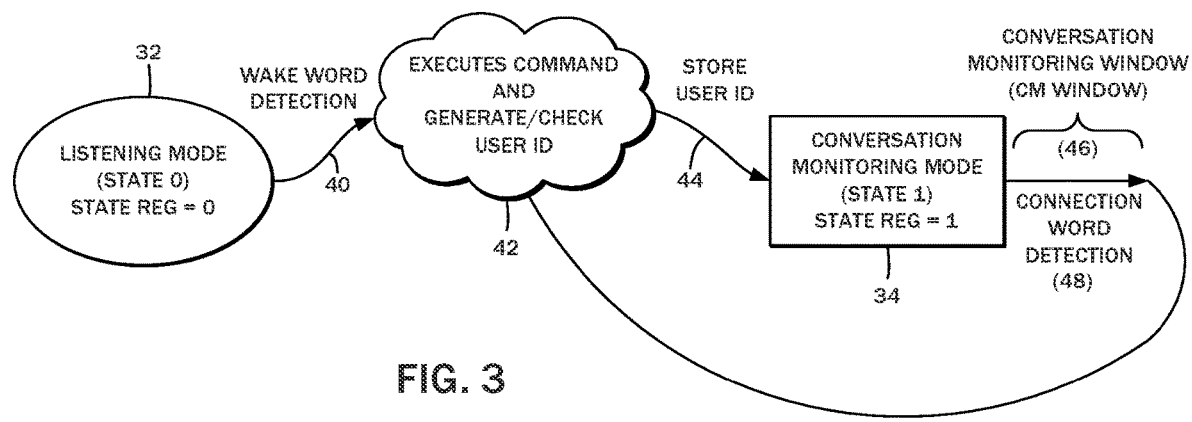
FIG. 3 is a state diagram of an edge device for extending a conversational sequence according to one embodiment of the present disclosure, the state diagram showing connection word detection.

The state diagram of FIG. 3 illustrates the operation of the state machine 30 as it transitions from the listening mode 32 to the conversation monitoring mode 34 after a wake word detection 40. There is also an intermediate state 42 in which the remote command processor 24 executes the accompanying command and generates or checks the user identifier. The generated value of the user identifier is stored in the user identifier register 38 according to a transition step 44, as the state machine 30 enters the conversation monitoring mode 34. In this state, the edge device 10 is monitoring for either a wake word or a connection word within a predefined conversation monitoring window (CM window) 46. Example connection words include "and", "or", "hmm", "umm", and the like, though it is understood that any connecting word or phrase to transition from one line of thought to another in a typical human conversation may also be included. If a connection word is detected, the command is relayed to the remote command processor 24 according to a transition step 48. The remote command processor 24 then executes the command per state 42, so long as the user identifier value generated from the connection word and accompanying command corresponds to the user identifier value stored in the user identifier register 38 from previous iterations, e.g., commands executed in response to the wake word. If there is no wake word or connection word that is detected within the conversation monitoring window 46, there is a timeout, the details of which will be described more fully below.

Once the state register 36 has a value of 1, that is, where the edge device 10 has already received the wake word and one command, in subsequent iterations in which connecting words and accompanying commands are received, so long as the connecting word and the command are received within the CM window, the edge device 10 interrupts the remote command processor 24 to execute that command. In some embodiments, the execution of the command may be preceded by a verification of the user identifier to confirm that the same user who spoke the initial wake word and accompanying command is the same as the one who spoke the subsequent connecting word and accompanying command. This may involve generating a separate user identifier value according to the methods described above and comparing that newly generated user identifier value to the one stored in the user identifier register 38. The state machine 30 continues to remain in the conversation monitoring mode, based upon an expectation of further user interaction. If it has been determined that the user who spoke the initial wake word and command is different from the user who spoke the connection word and the command, the subsequent command is ignored as it is deemed not to be part of the same conversation sequence as the initial wake word/command. In such case, the state machine 30 remains in the conversation monitoring mode 34 for the duration of the conversation monitoring window 46.

Figure 4:
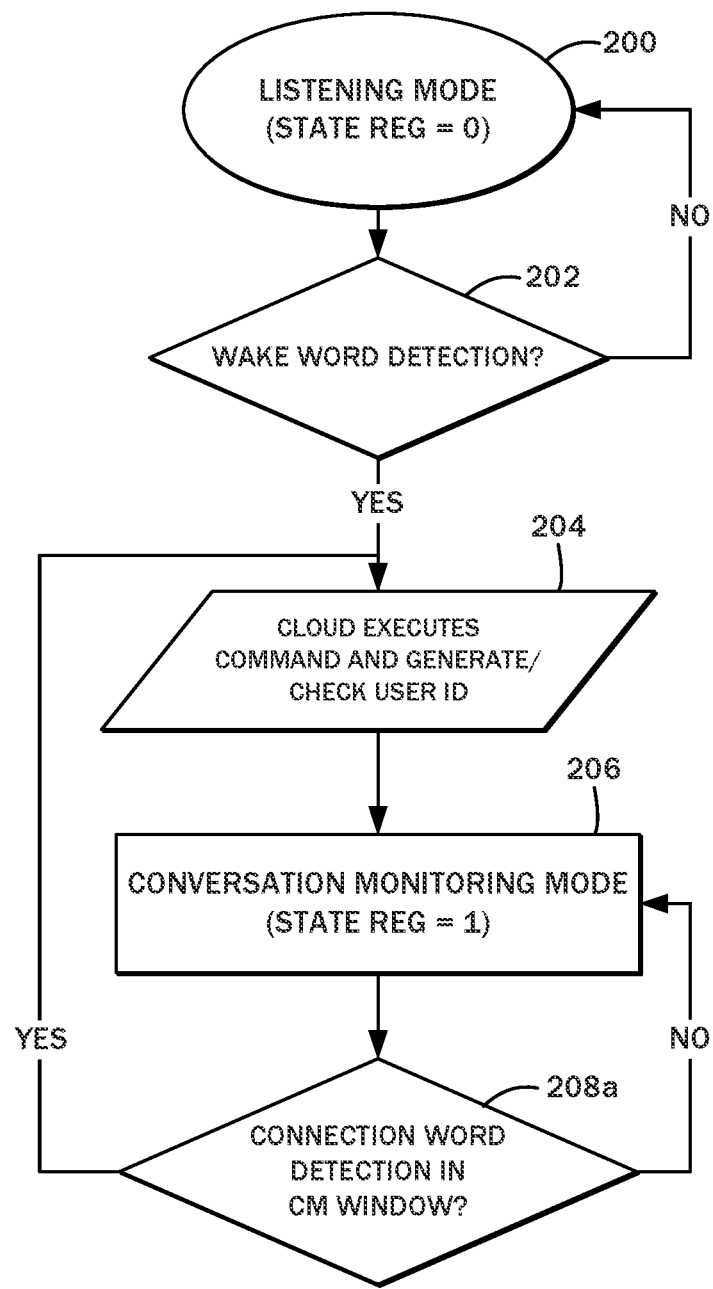
FIG. 4 is a flowchart illustrating the steps of a wake word method to prolong a conversational state between the human user and an edge device on which a voice assistant is implemented, the steps corresponding to connection word detection.

The flowchart of FIG. 4 specifically illustrates the steps of a connection word detection method performed by the edge device 10/state machine 30. This method begins with the state machine 30 in the listening mode 32 as discussed above, which is set forth as a method step 200 in the flowchart. In an evaluation step 202, a determination of a spoken wake word is made, and unless/until there is a wake word received, the state machine 30 remains in the listening mode 32; e.g., the method returns to the step 200. If a wake word is detected per the evaluation step 202, the method transitions to a step 204 in which the remote command processor 24/cloud executes the command accompanying the wake word and generates or checks the user identifier value as discussed above.

The method proceeds to the conversation monitoring mode 34, also referred to in the context of the flowchart as a step 206. The state register 36 has been set to a value of 1, indicating to the edge device 10 as well as the remote command processor 24 that the state machine 30 is in the conversation monitoring mode 34. The user identifier value is generated based upon the audio data and stored in the user identifier register 38 for later determining whether subsequent connection words are being spoken by the same user. In another evaluation step 208a, it is determined whether a connection word and accompanying command is detected while in the conversation monitoring window 46, and so the state machine remains in the conversation monitoring mode 34. If a connection word is detected, the method proceeds to the step 204 of executing the command and checking the user identifier value based upon the audio of such connection word and/or accompanying command, and comparing against the earlier stored user identifier value in the user identifier register 38.

The following example illustrates the steps of this method. The user may speak the wake word and ask the question, "what time is it?" At this point, the state machine 30 is in the listening mode 32 and detects the wake word according to the evaluation step 202. The edge device 10 then wakes up the cloud/remote command processor 24 and executes the "what time is it?" command according to the step 204. The remote command processor 24 then responds with the answer, such as "The time is now 12:45 PM." This answer is provided to the edge device 10 to be outputted to the user. The state machine 30 then enters into the conversation monitoring mode 34 per step 206. If, for example, the same user asks a follow-up question such as "and what is the nearest fast-food place?" the connection word "and" is evaluated as such according to the evaluation step 208a, and the edge device 10 wakes up the cloud/remote command processor 24 with an interrupt and executes the query for nearby fast-food establishments according to the step 204. The results from the query for fast food options is returned to the edge device 10 for announcement thereby. The cloud/remote command processor 24 may enter a sleep mode, while the edge device 10/state machine 30 enters the conversation monitoring mode according to the step 206.

Figure 5:
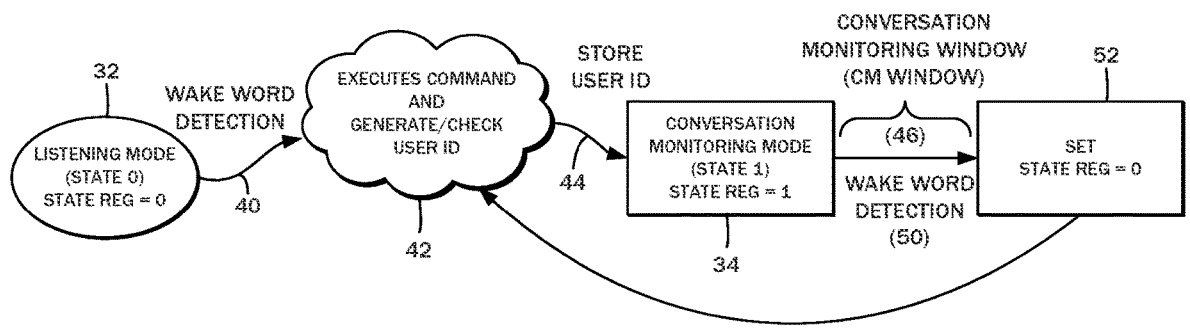
FIG. 5 is a state diagram of another embodiment of the edge device for extending the conversational sequence, the state diagram showing wake word detection.

The state diagram of FIG. 5 illustrates the operation of the state machine 30 as it transitions from the listening mode 32 to the conversation monitoring mode 34 after a wake word detection 40, followed by another wake word detection 50. From the initial wake word detection 40, there is the intermediate state 42 in which the remote command processor 24 executes the command accompanying the wake word and generates or checks the user identifier value. The generated user identifier value is stored in the user identifier register 38 according to the transition step 44, as the state machine 30 enters the conversation monitoring mode 34. In this state, the edge device 10 is monitoring for either a wake word or a connection word within a predefined conversation monitoring window (CM window) 46. For the example transitions shown, the edge device 10 is understood to detect a subsequent wake word in the transition step/wake word detection 50 rather than a connection word as described in the example above. The accompanying command is similarly executed in the intermediate state 42, but this is preceded by a further intermediate state 52 of setting the value of the state register 36 to zero. In other words, regardless of identity, the user who spoke the second wake word and command is deemed to be the "active" user for purposes of continuing the conversation, and the user identifier value derived from the audio of the second wake word and command is stored in the user identifier register 38.

Figure 6:
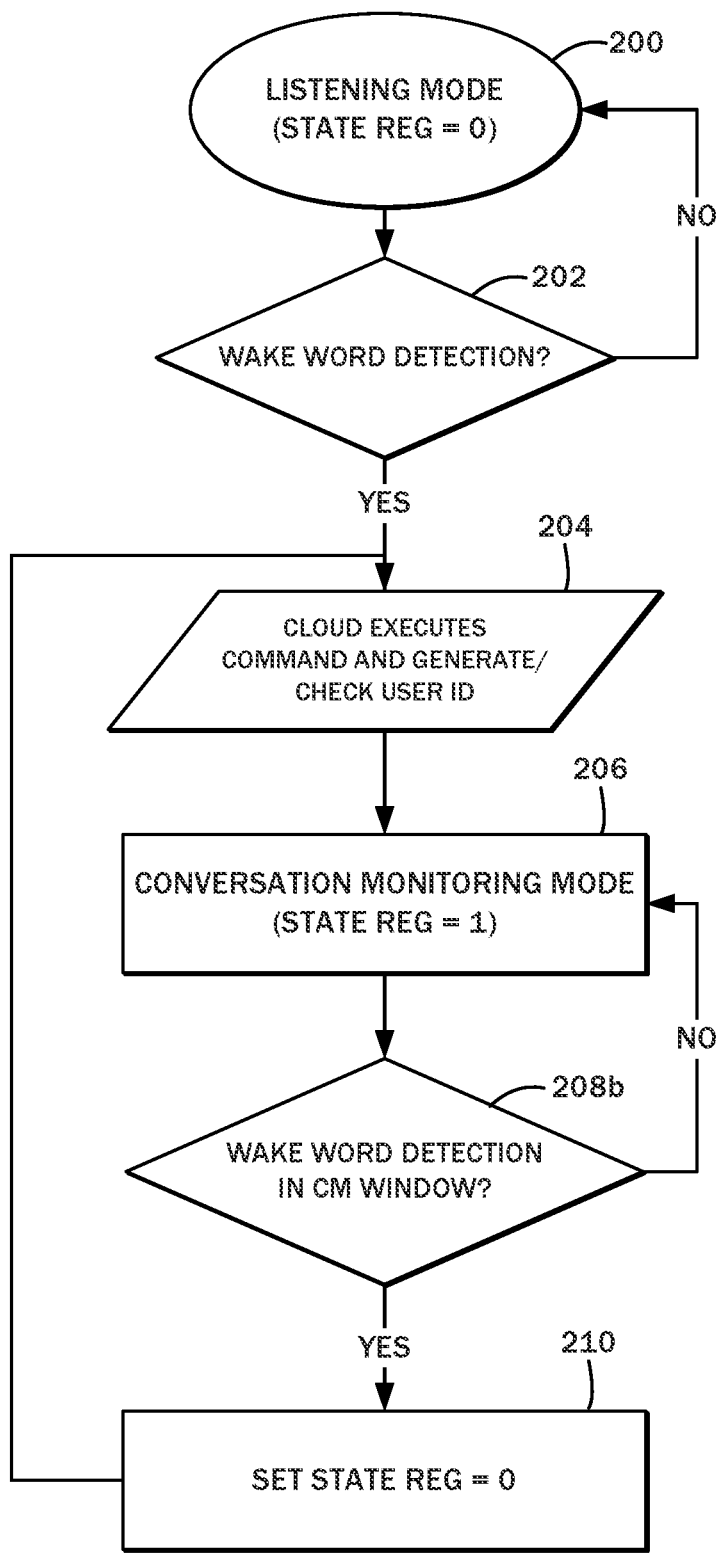
FIG. 6 is a flowchart illustrating another aspect of the wake word method to prolong the conversational state, including the steps for wake word detection.

The flowchart of FIG. 6 specifically illustrates the steps of a wake word detection method performed by the edge device 10/state machine 30. This method begins with the state machine 30 in the listening mode 32 as discussed above, which is set forth as the method step 200 in the flowchart. In the evaluation step 202, a determination of a spoken wake word is made, and unless/until there is a wake word received, the state machine 30 remains in the listening mode 32; e.g., the method returns to the step 200. If a wake word is detected per the evaluation step 202, the method transitions to a step 204 in which the remote command processor 24/cloud executes the command accompanying the wake word and checks the user identifier value.

The method proceeds to the conversation monitoring mode 34, also referred to in the context of the flowchart as the step 206. The state register 36 has been set to a value of 1, indicating to the edge device 10 as well as the remote command processor 24 that the state machine 30 is in the conversation monitoring mode 34. In another evaluation step 208*b*, it is determined whether another wake word and accompanying command is detected while in the conversation monitoring window 46. If a wake word is detected, the method proceeds to the step 210 of resetting the state register 36 to zero and returning to the step 204 of executing the command and generating the user identifier value based upon the audio of such connection word and/or accompanying command. The state machine 30 remains in the conversation monitoring mode 34 until the expiration of the conversation monitoring window 46.

The following example illustrates the steps of this method. The user may again speak the wake word and ask the question, "what time is it?" At this point, the state machine 30 is in the listening mode 32 and detects the wake word according to the evaluation step 202. The edge device 10 then wakes up the cloud/remote command processor 24 and executes the "what time is it?" command according to the step 204. The remote command processor 24 then responds with the answer, such as "The time is now 12:45 PM." This answer is provided to the edge device 10 to be outputted to the user. The state machine 30 then enters into the conversation monitoring mode 34 per step 206, but detects a subsequent wake word with an accompanying command while within the conversation monitoring window 46: "[wake word], is there rain in the forecast?" The state register 36 is reset to zero according to the step 210, and the remote command processor 24/cloud executes the command, e.g., "is there rain the forecast?" in the step 204. The answer to this question is generated by the remote command processor 24 and relayed to the edge device 10 for announcement thereon, such as "yes, there is a 10% chance of rain this afternoon." The cloud/remote command processor 24 may enter a sleep mode, while the edge device 10/state machine 30 enters the conversation monitoring mode according to the step 206.

Figure 7:
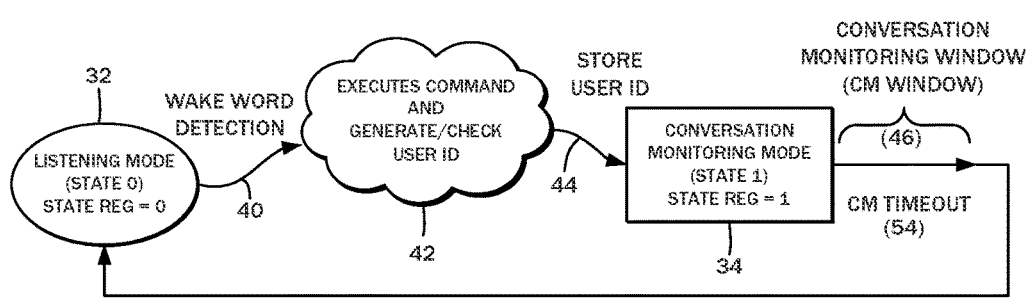
FIG. 7 is a state diagram of an embodiment of the edge device for extending the conversational sequence, the state diagram showing conversation monitoring timeout.

The state diagram of FIG. 7 illustrates the operation of the state machine 30 as it transitions from the listening mode 32 to the conversation monitoring mode 34 after a wake word detection 40, followed by a conversation mode timeout. From the initial wake word detection 40, there is the intermediate state 42 in which the remote command processor 24 executes the command accompanying the wake word and generates or checks the user identifier. The generated user identifier value is stored in the user identifier register 38 according to the transition step 44, as the state machine 30 enters the conversation monitoring mode 34. In this state, the edge device 10 is monitoring for either a wake word or a connection word within a predefined conversation monitoring window (CM window) 46. For the example transitions shown, the edge device 10 does not detect a subsequent wake word or connection word, and times out the conversation per transition step 54. In such case, the state machine 30 returns to the listening mode 32, with the state register 36 being reset to zero.

Figure 8:
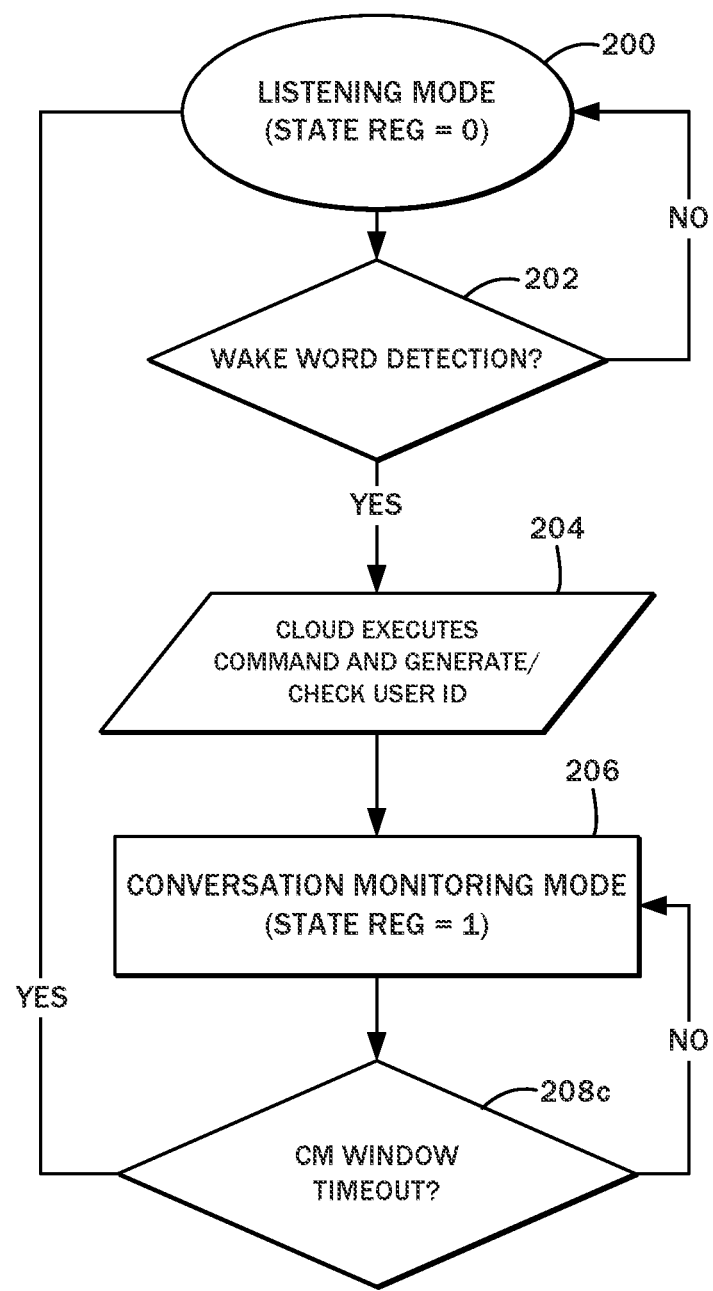
FIG. 8 is a flowchart illustrating an aspect of the wake word method to prolong the conversational state, including the steps for conversation monitoring timeout.

The flowchart of FIG. 8 illustrates the steps of a wake word detection method followed by a conversation monitoring window 46 timeout as performed by the edge device 10/state machine 30. This method begins with the state machine 30 in the listening mode 32 as discussed above, which is set forth as the method step 200 in the flowchart. In the evaluation step 202, a determination of a spoken wake word is made, and unless/until there is a wake word received, the state machine 30 remains in the listening mode 32; e.g., the method returns to the step 200. If a wake word is detected per the evaluation step 202, the method transitions to a step 204 in which the remote command processor 24/cloud executes the command accompanying the wake word and generates or checks the user identifier value.

The method proceeds to the conversation monitoring mode 34, also referred to in the context of the flowchart as the step 206. The state register 36 has been set to a value of 1, indicating to the edge device 10 as well as the remote command processor 24 that the state machine 30 is in the conversation monitoring mode 34. In another evaluation step 208*c*, it is determined whether there has been a conversation monitoring window timeout. If no wake word or connection word is detected, the method proceeds to the step 210 of resetting the state register 36 to zero and returning to the step 200 of the listening mode 32.

The following example illustrates the steps of this method. The user may again speak the wake word and ask the question, "what time is it?" At this point, the state machine 30 is in the listening mode 32 and detects the wake word according to the evaluation step 202. The edge device 10 then wakes up the cloud/remote command processor 24 and executes the "what time is it?" command according to the step 204. The remote command processor 24 then responds with the answer, such as "The time is now 12:45 PM." This answer is provided to the edge device 10 to be outputted to the user. The state machine 30 then enters into the conversation monitoring mode 34 per step 206, but without a subsequent wake word or connection word, the state machine 30 transitions back to the listening mode 32 according to the step 200.

In accordance with the embodiments of the present disclosure, the state machine 30 is initially in the listening mode 32 (state 0) and will interrupt the cloud/remote command processor 24 upon detecting the wake word. The remote command processor 24 executes the command and generates a user identifier value. State machine 30/edge device 10 transitions to the conversation monitoring mode 34 (state 1) for a predetermined period (conversation monitoring window 46. During state 1, e.g., the conversation monitoring mode, the edge device 10 may detect a connection word. In such case, the edge device 10 interrupts the cloud/remote command processor 24 and executes the command if the user identifier values match. Otherwise, the remote command processor 24 ignores the command, and returns to a sleep mode. The edge device 10/state machine 30 continues to remain in state 1 where the state register 36 is likewise set to 1 in anticipation of further interaction.

Alternatively, the edge device 10 may detect a wake word within the conversation monitoring window 46. The edge device 10/state machine 30 sets the state register to 0, interrupts the cloud/remote command processor 24 to process the wake word command. As part of this process, the user identifier value is generated based on the recorded audio. Yet another possibility is for the conversation monitoring window 46 to timeout, and neither a wake word nor a connection word is detected. In such case, the edge device 10/state machine 30 returns to the listening mode 32 (state 0) until the next wake word and accompanying command.

The particulars shown herein are by way of example and for purposes of illustrative discussion of the embodiments of wake word methods for prolonging a conversational state between a human and a machine and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A voice-activated system edge device cooperating with a remote command processor, the edge device comprising:
   a processor implementing a state machine defined by a listening mode state and a conversation monitoring mode state, the state machine transitioning from the listening mode state to the conversation monitoring mode state in response to a wake word detection, a first command accompanying the wake word being transmitted to the remote command processor for execution thereon, the conversation monitoring mode state being maintained for a conversation monitoring window time duration to receive a connection word accompanied by a second command, and the first command being identified as separate from the second command based upon detection of the connection word, wherein the connection word is detected by the edge device monitoring for either the wake word or one of a plurality of connection words within the conversation monitoring window, and wherein the connection words signal transitioning from one line of thought associated with the first command to another line of thought associated with the second command emulative of natural language conversation; and
   a user identifier register storing identity values of one or more users issuing the wake word and the first command,
   wherein the second command is transmitted to the remote command processor for further execution thereon following a verification of the identity value of the user issuing the wake word and the first command as stored in the user register, and an identity value of the user issuing the connection word and the second command being the same.

2. The edge device of claim 1, further comprising:
   a state register storing a machine state value corresponding to either the listening mode state or the conversation monitoring mode state.

3. The edge device of claim 2, wherein the state register and the user identifier register are readable by the remote command processor.

4. The edge device of claim 2, wherein the state register is reset after expiration of the conversation monitoring window time duration, and the state machine returns to the listening mode state.

5. The edge device of claim 2, wherein a unique identity value is generated based upon an evaluation of audio data of the wake word and the first command, or the connection word and the second command.

6. The edge device of claim 1, further comprising:
   a microphone; and
   an audio signal processor connected to the microphone and receptive to the wake word and the first command, and the connection word and the second command.

7. A method for extending a conversational state between a user and a voice-activated system edge device cooperating with a remote command processor, the method comprising the steps of:
   receiving a first audio signal of a wake word and an first command;
   detecting the wake word;
   transmitting the first command to the remote command processor for execution thereby in response to the detection of the preceding wake word;
   storing in a user identification register on the edge device a first user identification value received from the remote command processor and based upon a portion of the first audio signal of either or both the wake word and the first command;
   setting a conversation monitoring mode on the edge device after the first command is executed by the remote command processor;
   receiving, on the edge device while in the conversation mode, a second audio signal of a connection word and a second command, the first command being identified as separate from the second command based upon detection of the connection word, wherein the connection word is detected by the edge device monitoring for either the wake word or one of a plurality of connection words within the conversation monitoring window, and wherein the connection words signal transitioning from one line of thought associated with the first command to another line of thought associated with the second command emulative of natural language conversation;
   transmitting the second command to the remote command processor; and
   receiving on the edge device from the remote command processor a second user identification value based upon a portion of the second audio signal of either or both the connection word and the second command,
   wherein the remote command processor executes the second command accompanied by the connection word in response to a verification of the first user identification value and the second user identification value being the same.

8. The method of claim 7, wherein the edge device sets the conversation monitoring mode for a predetermined conversation monitoring window time duration.

9. The method of claim 8, wherein the connection word and the accompanying second command is ignored outside of the predetermined conversation monitoring window time duration.

10. The method of claim 7, further comprising:
    setting a listening mode on the edge device after expiration of the predetermined conversation monitoring window time duration;
    wherein the edge device is receptive solely to a subsequent wake word and accompanying command.

11. The method of claim 10, wherein the listening mode and the conversation monitoring mode are defined in a state register readable by both the edge device and the remote command processor.

12. The method of claim 7, further comprising:
receiving, on the edge device while in the conversation mode, a third audio signal of a second wake word and an accompanying third command; and
transmitting the third command to the remote command processor for execution thereon.

13. The method of claim 7 wherein the user identification register is accessible to both the remote command process and the edge device.

14. An article of manufacture comprising a non-transitory program storage medium readable by an edge device, the medium tangibly embodying one or more programs of instructions executable by the edge device to perform a method for extending a conversational state between a user and the edge device cooperating with a remote command processor, the method comprising the steps of:
receiving a first audio signal of a wake word and an first command;
detecting the wake word;
transmitting the first command to the remote command processor for execution thereby in response to the detection of the preceding wake word;
storing in a user identification register on the edge device a first user identification value received from the remote command processor and based upon a portion of the first audio signal of either or both the wake word and the first command;
setting a conversation monitoring mode on the edge device after the first command is executed by the remote command processor;
receiving, on the edge device while in the conversation mode, a second audio signal of a connection word and a second command the first command being identified as separate from the second command based upon detection of the connection word, wherein the connection word is detected by the edge device monitoring for either the wake word or one of a plurality of connection words within the conversation monitoring window, and wherein the connection words signal transitioning from one line of thought associated with the first command to another line of thought associated with the second command emulative of natural language conversation;
transmitting the second command to the remote command processor; and
receiving on the edge device from the remote command processor a second user identification value based upon a portion of the second audio signal of either or both the connection word and the second command,
wherein the remote command processor executes the second command accompanied by the connection word in response to a verification of the first user identification value and the second user identification value being the same.

15. The article of manufacture of claim 14, wherein the method performed by the edge device further comprising:
setting a listening mode on the edge device after expiration of the predetermined conversation monitoring window time duration;
wherein the edge device is receptive solely to a subsequent wake word and accompanying command.

16. The article of manufacture of claim 14, wherein the method performed by the edge device further comprising:
receiving, on the edge device while in the conversation mode, a third audio signal of a second wake word and an accompanying third command; and
transmitting the third command to the remote command processor for execution thereon.

* * * * *